(12) United States Patent
Namiki (10) Patent No.: US 11,461,584 B2
(45) Date of Patent: Oct. 4, 2022

(54) DISCRIMINATION DEVICE AND MACHINE LEARNING METHOD

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 393 days.

(21) Appl. No.: 16/640,729

(22) PCT Filed: Aug. 1, 2019

(86) PCT No.: PCT/JP2019/030247
§ 371 (c)(1),
(2) Date: Feb. 21, 2020

(87) PCT Pub. No.: WO2020/039882
PCT Pub. Date: Feb. 27, 2020

(65) Prior Publication Data
US 2020/0193219 A1 Jun. 18, 2020

(30) Foreign Application Priority Data
Aug. 23, 2018 (JP) .............................. JP2018-156624

(51) Int. Cl.
*G06K 9/62* (2022.01)
*G06N 20/00* (2019.01)
*G06F 17/18* (2006.01)

(52) U.S. Cl.
CPC ........... *G06K 9/6234* (2013.01); *G06F 17/18* (2013.01); *G06K 9/6256* (2013.01); *G06K 9/6262* (2013.01); *G06N 20/00* (2019.01)

(58) Field of Classification Search
CPC ......... G06K 9/6278; G06T 7/11; G06T 7/143; G06V 10/50
See application file for complete search history.

(56) References Cited

U.S. PATENT DOCUMENTS 7,751,599 B2 * 7/2010 Chen .................... G06V 10/451
382/192
8,750,570 B2 * 6/2014 Kerschner .............. G06V 10/10
348/135

(Continued)

FOREIGN PATENT DOCUMENTS

JP 2005-52926 A 3/2005
JP 2013-140090 A 7/2013

(Continued)

*Primary Examiner* — Yosef Kassa
(74) *Attorney, Agent, or Firm* — Hauptman Ham, LLP (57) ABSTRACT

A discrimination device includes a sub-data set extraction unit for extracting from a plurality of labeled learning data a sub-learning data set to be used for learning and a sub-verification data set to be used for verification, a learning unit for performing supervised learning on the basis of the sub-learning data set to generate a pre-trained model for discriminating a label from data related to an object, a discrimination unit for conducting a discrimination processing using the pre-trained model on each piece of learning data contained in the sub-verification data set, a verification result recording unit for recording a result of the discrimination processing in association with the learning data, and a correctness detection unit for detecting learning data attached with a label that may be incorrect based on the discrimination processing results recorded in association with respective learning data.

7 Claims, 4 Drawing Sheets

(56) References Cited

U.S. PATENT DOCUMENTS

| | | | | |
|---|---|---|---|---|
| 8,755,837 | B2* | 6/2014 | Rhoads | H04N 1/2133 |
| | | | | 382/312 |
| 8,804,005 | B2* | 8/2014 | Mei | G06V 20/40 |
| | | | | 382/173 |
| 10,223,610 | B1* | 3/2019 | Akselrod-Ballin | G06T 7/194 |
| 10,592,820 | B2* | 3/2020 | Cao | G06K 9/6278 |
| 2014/0314302 | A1 | 10/2014 | Minato et al. | |
| 2015/0120624 | A1 | 4/2015 | Yokono et al. | |
| 2018/0082215 | A1 | 3/2018 | Mizobuchi | |

FOREIGN PATENT DOCUMENTS

| | | |
|---|---|---|
| JP | 2015-21756 A | 2/2015 |
| JP | 2015-87903 A | 5/2015 |
| JP | 201845559 A | 3/2018 |
| JP | 201897671 A | 6/2018 |
| JP | 2018-155522 A | 10/2018 |

\* cited by examiner

|  | LEARNING DATA 1 | LEARNING DATA 2 | ... | LEARNING DATA n |
|---|---|---|---|---|
| NUMBER OF CORRECT ANSWERS | 11 | 87 | ... | 93 |
| NUMBER OF TIMES OF DISCRIMINATION | 90 | 88 | ... | 93 |
| PROBABILITY OF CORRECTNESS | 0.122 | 0.989 | ... | 1.000 |

FIG. 4

DISCRIMINATION DEVICE AND MACHINE LEARNING METHOD

RELATED APPLICATIONS

The present application is a National Phase of International Application Number PCT/JP2019/030247 filed Aug. 1, 2019, and claims priority from Japanese Application Number 2018-156624 filed Aug. 23, 2018.

BACKGROUND OF THE INVENTION

Field of the Invention

The present invention relates to a discrimination device and a machine learning method, in particular relates to a discrimination device and a machine learning method for detecting annotation errors.

Description of the Related Art

Conventionally, appearance inspections or equivalent have been performed in which images of the appearances of objects, such as products and similar manufactured at factories are taken by imaging means to sort the products based on the obtained images and classify the products into non-defective products and defective products having scratches, cracks or the like (see e.g. Patent Literatures 1 to 3). As technique for performing the appearance inspections on the objects based on the captured images of the appearances of the objects, there is a technique used in machine learning that utilizes a machine learning device, such as deep neural network. When such technique is employed, an operation called annotation is carried out as a stage prior to the learning performed by an appearance inspection system using images. In the annotation stage, the operation called annotation is conducted to associate labels indicative of whether the images show defective portions with respective image data. In this annotation, an operator confirms the images one by one to visually determine whether or not any defective portions are present in the objects in the images.

CITATION LIST

Patent Literature

[Patent Literature 1] Japanese Patent Laid-Open Publication No. 2015-021756
[Patent Literature 2] Japanese Patent Laid-Open Publication No. 2005-052926
[Patent Literature 3] Japanese Patent Laid-Open Publication No. 2013-140090

SUMMARY OF THE INVENTION

Problems to be Solved by the Invention

In this way, since the annotation on the images is usually carried out manually, the objects can be labeled as defective products when obvious deformations, scratches and others are found in the objects, and on the other hand, subtle differences, such as characteristic positions and dimensions of the objects (e.g. positions and dimensions of holes created in the products), tend to be overlooked during comparison with good products, causing difficulty in performing the annotation inconsistency. Furthermore, even if the objects are apparently defective, human-caused careless mistakes may easily lead to erroneous determinations about the objects as being good and vice versa.

Inconsistent annotation due to such human-caused mistakes makes a learning device, namely pre-trained model, which can accurately determine about defectiveness, unable to implement learning. As a consequence, the accuracy rate of inspection results by machine learning will not reach a practical level. When a man corrects the above mistakes, it is necessary to reconfirm all annotations visually, which is a very time-consuming task. Such problem is not specific to machine learning devices to be adopted for the appearance inspections by using the images, and a similar problem arises in performing machine learning using learning data produced by manually performing the annotation.

It is an object of the invention to provide a discrimination device and a machine learning method enabling to detect annotation errors.

Means for Solving the Problems

The present invention repeatedly carries out discrimination processing on labels on the basis of learning data and verification data extracted from a learning data set, and in turn conducts statistic processing on discrimination results to detect annotations having a high probability of being incorrect, thereby providing detection results to an operator for correction. This technique can improve the accuracy of annotation to allow a machine learning device to perform learning more precisely, and further improves the accuracy of discrimination of objects by using pre-trained model generated by such learning.

More specifically, this technique enables to detect errors in the annotations according to the following steps.

Step 1) Select learning data from learning data sets by a predetermined number or proportion. It is desirable to apply a method that performs selection so that bias is less likely to occur, e.g. random selection.

Step 2) Designate a group of learning data sets selected in Step 1 as sub-learning data set.

Step 3) Designate the remaining group of learning data sets that is not selected in Step 1 as sub-verification data set.

Step 4) By using the sub-learning data set, perform learning on a learning unit in the same way as normal learning.

Step 5) By using the learning unit created in Step 4, perform discrimination on the sub-verification data set.

Step 6) Increment by one the number of times of discrimination of each piece of learning data discriminated in Step 5, and when a discrimination result matches the annotation, then increment the number of correct answers of the corresponding learning data by one.

Step 7) Conduct Steps 1 to 6 a predefined number of times by varying the way of the selection in Step 1.

Step 8) Calculate a value, which is obtained by dividing the number of correct answers of each piece of learning data by the number of times of discrimination, as a probability of correctness of the annotation of the concerned learning data.

Step 9) Provide a user with learning data having a probability of each piece of learning data calculated in Step 8 lower than a predefined threshold value as learning data in which the annotation is incorrect, so as to reconfirm the correctness of the annotation and then correct the annotation if necessary.

Step 10) After the correction of the annotation errors, perform the learning by using all learning data sets.

One aspect of the present invention is a discrimination device for detecting annotation errors, which comprises: a learning data memory for storing a learning data set consisting of a plurality of learning data; a data acquisition unit for acquiring data related to an object to be discriminated and storing the data as learning data in the learning data memory; a labeling unit for labeling the learning data; a sub-data set extraction unit for extracting a sub-learning data set to be used for learning and a sub-verification data set to be used for determination from the learning data set stored in the learning data memory; a learning unit for performing supervised learning based on the sub-learning data set to generate a pre-trained model for discriminating a label from the data related to the object; a discrimination unit for conducting discrimination processing using the pre-trained model on each piece of learning data contained in the sub-verification data set; a verification result recording unit for recording in the learning data memory discrimination processing results with respect to each piece of learning data conducted by the discrimination unit in association with the learning data; and a correctness detection unit for detecting learning data having a label attached by the labeling unit that may be incorrect, wherein the extraction of the sub-learning data set and the sub-verification data set by the sub-data set extraction unit, the generation of the pre-trained model by the learning unit and the discrimination processing by the discrimination unit are carried out a predefined number of times, the correctness detection unit calculates a probability of correctness of the label attached by the labeling unit based on discrimination processing results obtained by executing the processing the predefined number of times by the discrimination unit, and based on the probability of correctness of the label thus calculated, detecting learning data having a label attached by the labeling unit that may be incorrect.

Another aspect of the present invention is a machine learning method for detecting annotation errors, comprising: a learning data memory for storing a learning data set consisting of a plurality of learning data; a first step of acquiring data related to an object to be discriminated; a second step of labeling the learning data acquired in the first step; a third step of extracting from a set of learning data thus labeled in the second step a sub-learning data set to be used for learning and a sub-verification data set to be used for verification; a fourth step of conducting supervised learning on a basis of the sub-learning data set to generate a pre-trained model for discriminating the label from the data related to the object; a fifth step of carrying out discrimination processing using the pre-trained model on each piece of learning data contained in the sub-verification data set; a sixth step of recording a result of the discrimination processing performed on each piece of learning data in the fifth step in association with the learning data; and a seventh step of detecting learning data attached with a label that may be incorrect on a basis of the results of the discrimination processing recorded in association with the respective learning data in the sixth step, wherein the third to fifth steps are executed a predefined number of times, the seventh step calculates a probability of correctness of the label attached to each piece of learning data based on the results of the discrimination processing executed the predefined number of times in the fifth step to detect learning data attached with a label that may be incorrect based on the probability of correctness of the label thus calculated.

Effect of the Invention

The present invention enables to automatically detect possible incorrect labels with respect to the annotation (labeling) on the data related to the objects performed manually by an operator so as to correct the labels in which the errors are thus detected, thereby generating a pre-trained model on the basis of correct learning data.

DETAILED DESCRIPTION OF THE PREFERRED EMBODIMENTS

Hereinafter, embodiments of the present invention will be described with reference to the drawings.

Figure 1:
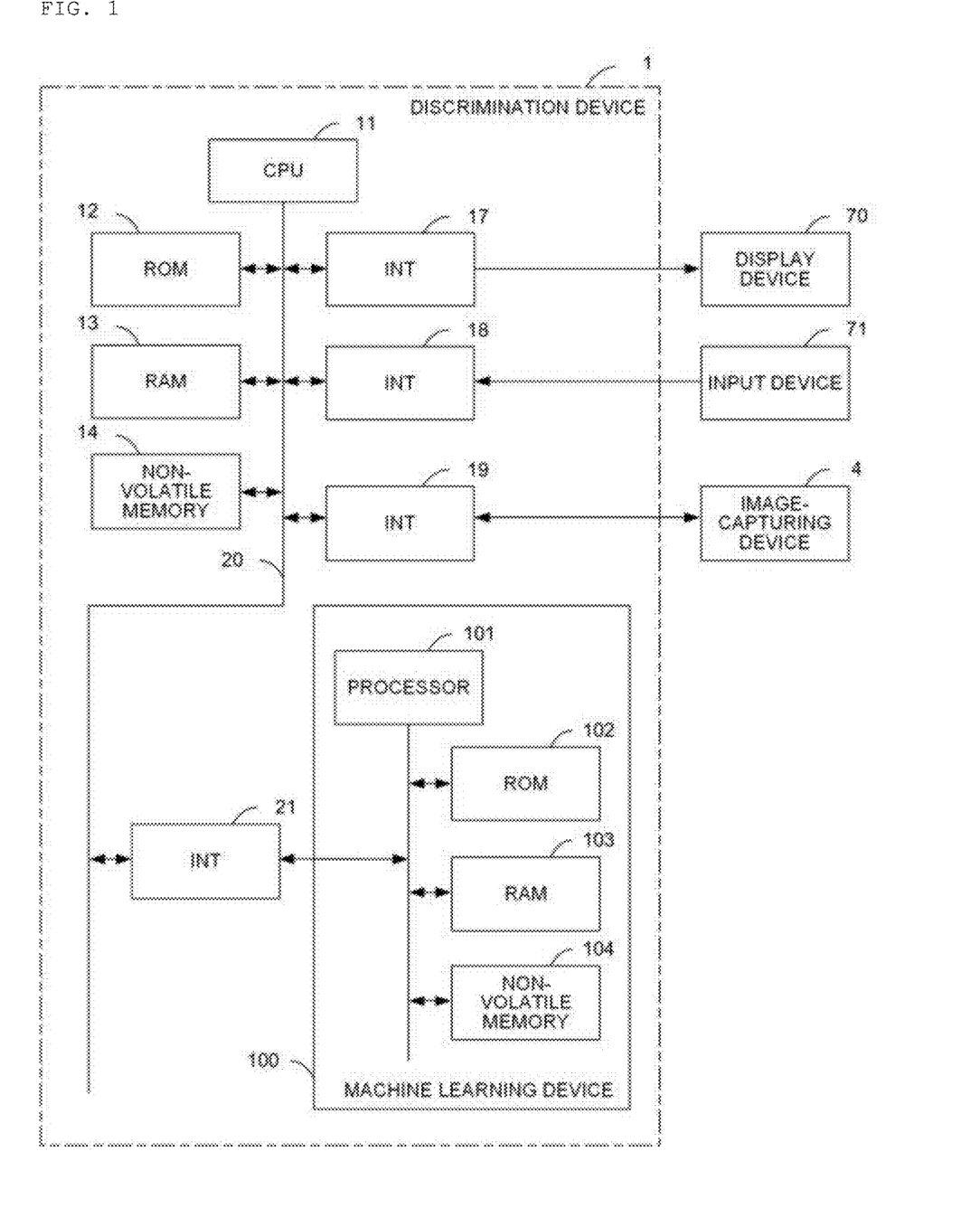
FIG. 1 is a schematic hardware configuration diagram showing a main section of a discrimination device having a machine learning device according to an embodiment.

FIG. 1 is a schematic hardware configuration diagram showing a main section of a discrimination device with a machine learning device according to a first embodiment. In the illustrative embodiment, a description will be made about a case where a machine learning method for detecting annotation errors is implemented on a discrimination device to be used for appearance inspections.

FIG. 1 is the schematic hardware configuration diagram showing the main section of the discrimination device according to one embodiment of the invention. A discrimination device 1 of the embodiment can be implemented as a personal computer installed in a factory or as a computer for administrating machinery installed in the factory, such as a cell computer, a host computer, an edge computing platform or cloud computing system. FIG. 1 illustrates a case of implementing the discrimination device 1 as a personal computer installed in the factory.

The discrimination device 1 of the embodiment comprise a central processing unit (CPU) 11, which is a processor for controlling the discrimination device 1 in its entirety. The CPU 11 reads out a system program stored in a read only memory (ROM) 12 via a bus 20 in order to entirely control the discrimination device 1 according to the system program. In a random access memory (RAM) 13, temporary calculation data, various data and others input by an operator through an input device 71 are stored temporarily.

A non-volatile memory 14 is composed of a memory, a solid state drive (SSD) or similar that is backed up with a battery, not shown, so as to retain its storage state even when a power source of the discrimination device 1 is turned off. The non-volatile memory 14 stores a setting area storing setting information relating to an operation of the discrimination device 1, programs, data and others input by the input device 71, which are learning data sets loaded via an exterior memory and networks, now shown. The programs and various data stored in the non-volatile memory 14 may be loaded into the RAM 13 during execution/utilization. In the ROM 12, a system program is written beforehand that includes, for example, a known analysis program for analyzing the learning data set and a program for controlling data exchange with a machine learning device 100 which will be described later.

An image-capturing device 4 is an electronic camera having an imaging element such as a charge coupled device (CCD), which is a known light-receiving device having a function of detecting a two-dimensional image on an imaging surface (CCD array surface) by capturing an image. The image-capturing device 4 is attached to a hand of a robot not shown, for instance, so as to be moved by the robot to an imaging position where an image of an object of discrimination target is to be captured, and thereby send image data obtained by capturing an image of the object to the CPU 11 via an interface 19. Control related to the capturing of the image of the object by the image-capturing device 4 may be performed when the discrimination device 1 executes a program. Alternatively, the control related to the capturing of the image of the object by the image-capturing device 4 may be carried out by controlling with a robot controller controlling the robot or other devices.

A display device 70 is for displaying data output through the interface 17, such as data read in the memory, data obtained by executing programs and similar, the image data of the object derived by capturing the image with the image-capturing device 4 and data output from the machine learning device 100 which will be described later. The input device 71 consisting of a keyboard, a pointing device and the like receives instructions, data and others on the basis of the operation by the operator to transfer them to the CPU 11 via an interface 18.

An interface 21 is for connecting the discrimination device 1 to the machine learning device 100. The machine learning device 100 comprises a processor 101 for controlling the entire machine learning device 100, a ROM 102 for storing a system program and equivalent, a RAM 103 for temporarily storing data in each processing related to machine learning, and a non-volatile memory 104 to be used to store a learning model and others. The machine learning device 100 can observe each piece of information (e.g. learning data set) acquirable by the discrimination device 1 via the interface 21. In addition to that, the discrimination device 1 acquires a processing result output from the machine learning device 100 via the interface 21.

Figure 2:
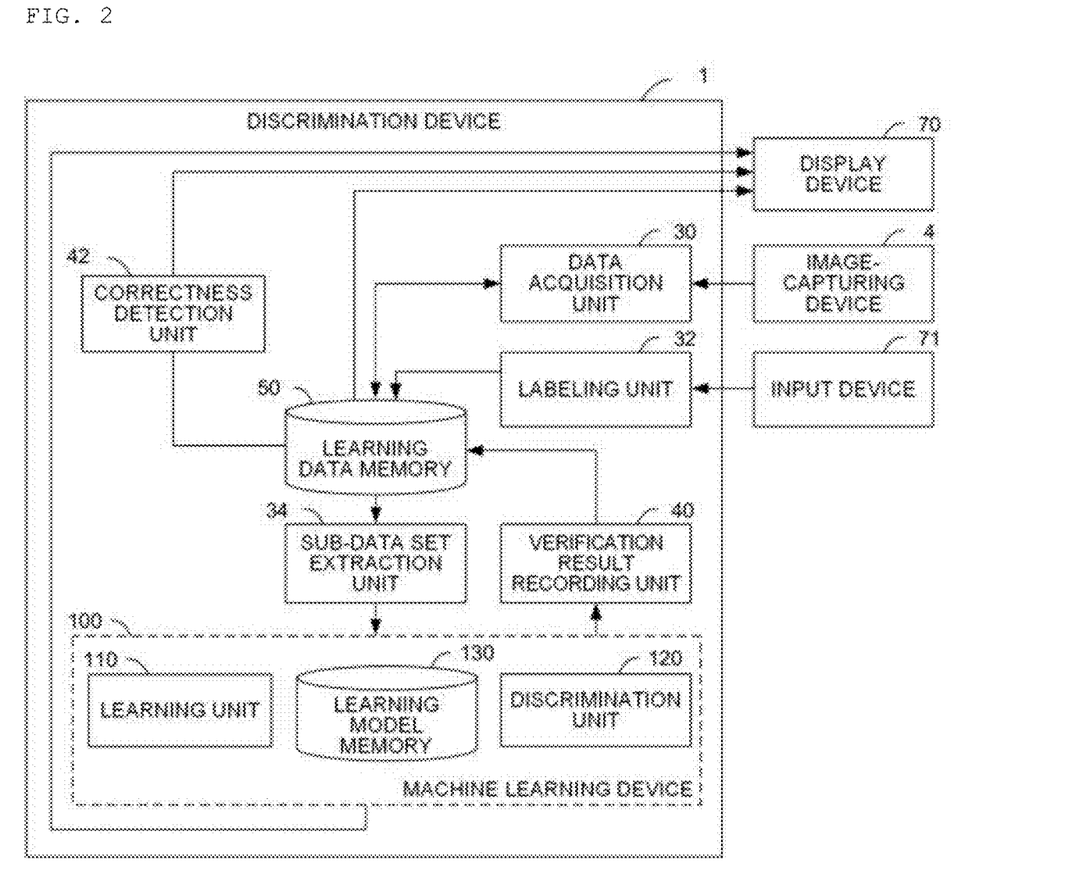
FIG. 2 is a schematic function block diagram of the discrimination device according to an embodiment.

FIG. 2 is a schematic function block diagram of the discrimination device 1 and the machine learning device 100 according to the first embodiment. The respective functions of the function blocks shown in FIG. 2 are implemented when the CPU 11 of the discrimination device 1 shown in FIG. 1 and the processor 101 of the machine learning device 100 execute respective system programs to control the operations of the respective units of the discrimination device 1 and the machine learning device 100.

The discrimination device 1 of the illustrative embodiment comprises a data acquisition unit 30, a labeling unit 32, a sub-data set extraction unit 34, a verification result recording unit 40 and a correctness detection unit 42, and the machine learning device 100 provided in the discrimination device 1 comprises a learning unit 110 and a discrimination unit 120.

The data acquisition unit 30 acquires data relating to an object to be discriminated from the image-capturing device 4. The data acquisition unit 30 may acquire the data relating to the object to be discriminated via an external memory device or a network, not shown. In the illustrative embodiment, as the object to be discriminated is a product or the like that is subjected to an appearance inspection, the data of the object acquired by the data acquisition unit 30 is image data. In this case, the data acquisition unit 30 may conduct a pretreatment to convert the acquired data into a data form to be treated in the discrimination device 1. For example, if the data of the object is an image as in this embodiment, the image processing means disclosed by, such as, Japanese Patent Laid-Open Publication No. 2017-91079 may be used to carry out processes to detect the position and attitude of the object in the image data, and then clip a partial image in a certain area previously defined with the detected position and attitude. The data of the object acquired by the data acquisition unit 30 is stored as learning data in a learning data memory 50 allocated as storage area in the non-volatile memory 14. The learning data stored in the learning data memory 50 can be stored in connection with the numbers of times of discrimination/correct answers. In this case, the numbers of times of discrimination/correct answers associated with the learning data are reset to zero (0) when the data is stored in the learning data memory 50 by the data acquisition unit 30.

The labeling unit 32 conducts labeling (annotation) to the learning data (data concerning the object) obtained by the data acquisition unit 30 and stored in the learning data memory 50, and then stores the label in relation to the learning data. The labeling unit 32 stores the labels, which are attached to the data by operating the input device 71 by an operator with reference to the learning data displayed on the display unit 70, in the learning data memory 50 in association with the learning data. The labeling unit 32 may automatically label the object as good product, for instance, when a discrimination value calculated on the basis of a mathematical algorithm for automatically conducting discrimination on the data of the object is equal to a predefined first threshold or more and label the object as bad product when the discrimination value is equal to a predefined second threshold or less. Furthermore, the automatic labeling result can be displayed on the display unit 70 to allow the operator to confirm and revise the result. When the object is discriminated between good and bad in the appearance inspection, by way of example, the labeling unit 32 labels the object as either of two types, namely good product/bad product. Alternatively, according to the discrimination purposes performed by the discrimination device 1, for example, the object may be labeled to three or more types (e.g. large/medium/small, type A/type B/ . . . ).

The sub-data set extraction unit 34 extracts as sub-learning data set the learning data in a predefined number or in a predetermined proportion from a plurality of learning data stored in the learning data memory 50 and extracts the other learning data as sub-verification data set. It is preferable that the sub-data sets extracted by the sub-data set extraction unit 34 are extracted such that bias is less likely to occur. For example, the learning data as sub-learning data set may be extracted at random from the learning data stored in the learning data memory 50, or a statistical sampling method, such as systematic sampling and similar, may be applied. Moreover, the sub-data set extraction unit 34 may extract preferentially learning data with a small number of discriminations as sub-verification data set, which data will be described later.

The learning unit 110 conducts supervised learning by using the sub-learning data set extracted by the sub-data set extraction unit 34, thereby generating (learning) from the data of the object a pre-trained model for use in estimation of s discrimination result (label). The learning unit 110 of the illustrative embodiment may be configured to use, for instance, a neural network as a learning model while using as input data the data relating to the object among the learning data respectively contained in the sub-learning data set extracted by the sub-data set extraction unit 34 to thereby perform supervised learning using the label as output data. When employing such configuration, a neural network comprising an input layer, an intermediate layer and an output layer may be used as a learning model, or otherwise, a configuration in which a so-called deep learning technique using a neural network consisting of three or more layers can be employed to implement more effective learning and inference. The learning by the learning unit 110 according to the illustrative embodiment can employ, for example, a technique for inputting each pixel value of image data to the learning model to calculate the degree of coincidence, back-propagating an error between the calculated degree of coincidence and an attached label to the learning model, and updating parameters of the learning model (error backpropagation method). The learning unit 110 may also be configured to perform the machine learning using an SVM or other learning models, and may select an appropriate learning model in consideration of the characteristics of the data related to the object to be discriminated by the discrimination device 1. The pre-trained model generated by the learning unit 110 is stored in a learning model memory 130 provided on the non-volatile memory 104, and is used for estimation processing based on the sub-verification data set by a discrimination unit 120.

The discrimination unit 120 carries out the discrimination (discrimination result estimation) on each piece of learning data contained in the sub-verification data set extracted by the sub-data set extraction unit 34 by using the pre-trained model generated by the learning unit 110. The discrimination unit 120 conducts discrimination processing on each piece of learning data contained in the sub-verification data set to discriminate the data related to the object of the concerned learning data as an input for the pre-trained model stored in the learning model memory 130, thereby outputting a discrimination result thus obtained to the verification result recording unit 40.

The verification result recording unit 40 stores each piece of learning data, which is contained in the sub-verification data set and subjected to the discrimination by the discrimination unit 120, in the learning data memory 50 by associating the discrimination result with the concerned learning data. The verification result recording unit 40 increments by one the number of times of discrimination of the learning data conducted by the discrimination unit 120, and also increments the number of correct answers of the learning data by one when the discrimination result by the discrimination unit 120 matches the label of the concerned learning data attached by the labeling unit 32.

The above-described extraction processing for the sub-learning data set and the sub-verification data set by the sub-data set extraction unit 34, the generation processing for the pre-trained model using the sub-learning data set by the learning unit 110, the discrimination processing for the sub-verification data set by the discrimination unit 120, and the recording processing for the discrimination result from the discrimination unit 120 by the verification result recording unit 40 are repeated a predetermined number of times. The number of repetitions may be defined on the basis of the number of pieces of learning data stored in the learning data memory 50. In addition to that, this repeating process can be continued until the number of times of discrimination stored by the verification result recording unit 40 with respect to all the pieces of learning data stored in the learning data memory 50 exceeds a predefined value.

It is to be noted that the sub-learning data set and the sub-verification data set extracted by the sub-data set extraction unit 34 during the repeating process are different each time. In this way, various combinations of sub-data sets are used to perform the learning by the learning unit 110 and the discrimination by the discrimination unit 120. Then, the discrimination processing is consequently conducted on each piece of learning data, and the verification result recording unit 40 records the numbers of times of discrimination and correct answers of respective learning data.

Figure 3:
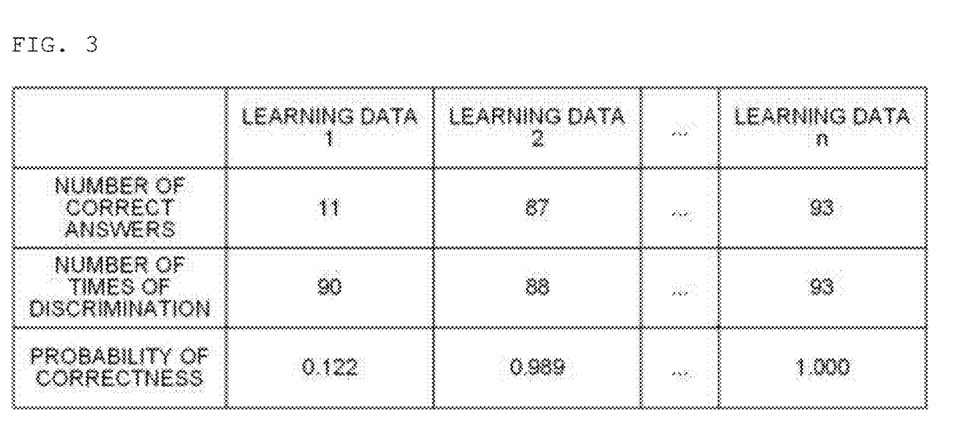
FIG. 3 is a diagram showing an example of a learning data set stored in a learning data memory.

The correctness detection unit 42 calculates a value obtained by dividing the number of correct answers with the number of times of discrimination with respect to each piece of learning data stored in the learning data memory 50 as a probability of correctness of the label (annotation) attached to the learning data in question. The correctness detection unit 42 may display on the display device 70 the learning data with a label having the probability of correctness lower than a predetermined threshold value as learning data attached with a label that may be incorrect. Consequently, the operator can reconfirm whether or not the label is correct according to the display on the display device 70, and then corrects the label by operating the input device 71 if required. The probability that the label calculated by the correction detection unit is correct may be stored in association with the learning data in the learning data memory 50, as illustrated in FIG. 3, by way of example.

The discrimination device 1 with this configuration discriminates possible incorrect labels from the labels attached to the acquired learning data based on the relationship with the labels attached to the other learning data. The operator can correct the labels on the basis of the discrimination results. Upon re-confirmation by the operator and by using a learning data set presumed to have been labeled properly, the learning unit 110 can regenerate a pre-trained model. Since the pre-trained model thus generated is generated based on the appropriate annotation, there is a possibility of implementing the discrimination of the object with high accuracy by using the pre-trained model.

Figure 4:
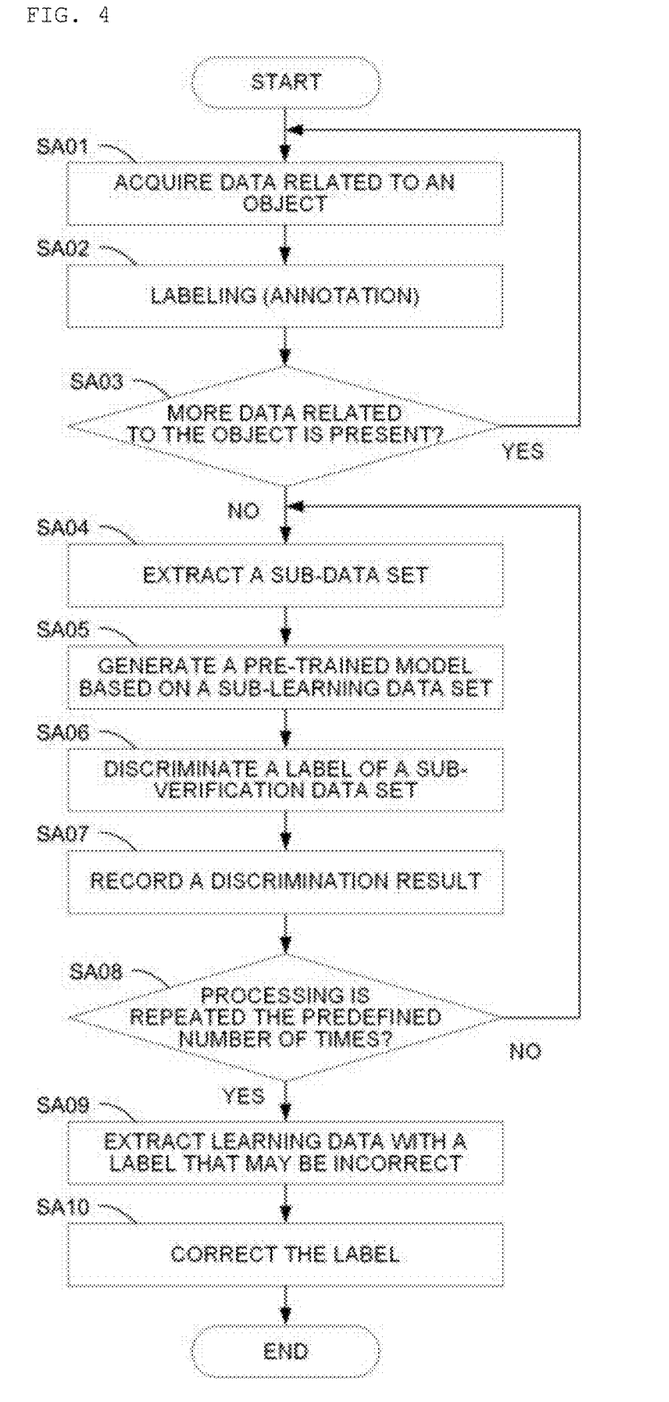
FIG. 4 is a schematic flowchart of processing executed on the discrimination device according to an embodiment.

FIG. 4 is a schematic flowchart showing processing of detecting annotation errors performed by the discrimination device 1 according to the illustrative embodiment.

Step SA01: The data acquisition unit 30 acquires data related to the object to store it as learning data in the learning data memory 50.

Step SA02: The labeling unit 32 performs the annotation (labeling) on the data of the object acquired in Step SA01, based on such as the operation by the operator, and stores the resultant in the learning data memory 50 in association with the learning data.

Step SA03: A determination is made about whether or not there are more data related to the object. If there are more data related to the object, the processing goes back to Step SA01, and if there are no more data related to the object, the processing goes to Step SA04.

Step SA04: The sub-data set extraction unit 34 extracts a sub-learning data set and a sub-verification data set from a learning data set stored in the learning data memory 50.

Step SA05: The learning unit 110 carries out supervised learning by using the sub-learning data set extracted in Step SA04 to generate a pre-trained model.

Step SA06: The discrimination unit 120 conducts discrimination processing on each piece of learning data contained in the sub-verification data set extracted in Step SA04, by using the pre-trained model generated in Step SA05.

Step SA07: The verification result recording unit 40 records a discrimination result obtained in Step SA06 in the learning data memory 50 as the numbers of times of discrimination/correct answers of each piece of learning data in association with the learning data.

Step SA08: A determination is made on whether Steps SA04 to SA07 have been repeated a predefined number of times. If these steps have been repeated the predefined number of times, the processing goes to Step SA09, and if the steps have not been repeated the predefined number of times, the processing goes to Step SA04.

Step SA09: The correctness detection unit 42 calculates a probability of correctness of a label attached to each piece of learning data based on the numbers of times of discrimination/correct answers of the learning data stored in the learning data memory 50, extracts learning data that may be attached with an incorrect label on the basis of a probability of correctness of the calculated label, and displays the extracted data on the display device 70.

Step SA10: The labeling unit 32 corrects the label attached to the learning data according to the operation by the operator.

As one variation of the discrimination device 1 of the illustrative embodiment, the discrimination device 1 may be configured to display on the display device 70 that it is difficult to properly discriminate labels using supplied learning data or learning models used for learning/discrimination, i.e. difficulty in discrimination of learning data sets. The difficulty can be determined based on the probability of correctness of the labels respectively attached to the learning data calculated by the correctness detection unit 42. The correctness detection unit 42 may, for example, conduct statistical processing with respect to the probability of correctness of the attached labels among the learning data sets stored in the learning data memory 50, and when an average of the probability of correctness of the labels attached to the learning data sets is significantly low or when a variance value is high, then determine the difficulty of proper discrimination of the labels using supplied learning data or learning models used for learning/discrimination, i.e. difficulty in discrimination of the learning data sets.

As another variation of the discrimination device 1 of the illustrative embodiment, the label attached to the object to be discriminated by the discrimination device 1 may be continuous value consisting of a coordinate value, an angle, quantity and others or a set of the continuous values, instead of being classified into a group where the object belongs to (discrete values such as good or defective). When the label is the continuous value or the set of continuous values, a pre-trained model generated by the learning unit 110 will output the continuous value (numeric value) or the set of continuous values by using data related to the object as an input, and the discrimination unit 120 will output the continuous value (numeric value) or the set of continuous values as an estimation result.

In this regard, the correctness of the label attached to the learning data can be determined by comparing a distance between the label attached to the learning data and an estimation value of the label output by the discrimination unit 120 with a predefined threshold value. Alternatively, the calculation of a probability of correctness of the concerned label can be conducted on the basis of a calculated distance. By way of example, the learning data memory 50 is configured to store each piece of learning data stored therein in association with a differential integrated value instead of the number of correct answers, and whenever the discrimination unit 120 carries out the discrimination processing on each piece of learning data contained in the sub-verification data set, the verification result recording unit 40 adds up an absolute value of the difference between the estimation value of the label output as a discrimination result by the discrimination unit 120 and the label attached to the learning data by the labeling unit 32 or a distance between the estimation value of the label output as the discrimination result by the discrimination unit 120 and the label attached to the learning data by the labeling unit 32 to the differential integrated value. The correctness detection unit 42 in turn calculates a probability of correctness of the label attached to the learning data in relation to each piece of learning data stored in the learning data memory 50 based on a value obtained by dividing the differential integrated value with the number of times of discrimination (e.g. the probability of correctness of the concerned label is calculated by means of a statistic technique relating to known probability distributions on the basis of the distribution of values calculated by dividing the differential integrated values of respective learning data with the number of times of discrimination).

The embodiment of the present disclosure is described above. However, the present invention is not limited to the example of the above embodiment and may be implemented in various aspects with the addition of appropriate modifications.

For example, the learning algorithm executed by the machine learning device 100, the operation algorithm executed by the machine learning device 100, the control algorithm executed by the discrimination device 1 and others are not limited to the above-described algorithms, and thus various algorithms can be employed.

In addition to that, although the discrimination device 1 and the machine learning device 100 are described as having different CPUs (processors) in the above embodiment, the machine learning device 100 may be implemented with the CPU 11 of the discrimination device 1 and the system program stored in the ROM 12.

The above embodiment presents an example using the image data generated by capturing the object to be used in the appearance inspection as data related to the object. However, the method for detecting the annotation errors according to the present invention may be applied to other data, such as waveform data of physical quantity of current/voltage, pressure and others acquired from the object, and audio data related to sounds come out from the object. Regardless of which data is targeted, this method can be applied appropriately when the operator carries out the annotation (labeling) based on his/her own senses.

LIST OF REFERENCE NUMERALS

1. Discrimination Device
4. Image-Capturing Device
11. CPU
12. ROM
13. RAM
14. Non-Volatile Memory
17, 18, 19. Interface
20. Bus
21. Interface
30. Data Acquisition Unit
32. Labeling Unit
34. Sub-Data Set Extraction Unit
40. Verification Result Recording Unit
42. Correctness Detection Unit
70. Display Device
71. Input Device
100. Machine Learning Device
101. Processor
102. ROM
103. RAM
104. Non-Volatile Memory
110. Learning Unit
120. Discrimination Unit
130. Learning Model Memory

The invention claimed is:

1. A discrimination device detecting annotation errors, comprising:
a learning data memory for storing a learning data set consisting of a plurality of learning data;
a data acquisition unit for acquiring data related to an object to be discriminated and storing the data as learning data in the learning data memory;
a labeling unit for labeling the learning data;
a sub-data set extraction unit for extracting a sub-learning data set to be used for learning and a sub-verification data set to be used for verification from the learning data set stored in the learning data memory;
a learning unit for performing supervised learning based on the sub-learning data set to generate a trained model for discriminating a label from the data related to the object;
a discrimination unit for conducting discrimination using the trained model on learning data contained in the sub-verification data set;
a discrimination result recording unit for recording in the learning data memory discrimination results conducted with respect to each learning data by the discrimination unit in association with the learning data; and
a correctness detection unit for detecting learning data having a label attached by the labeling unit that may be incorrect, wherein
the extraction of the sub-learning data set and the sub-verification data set by the sub-data set extraction unit, the generation of the trained model by the learning unit and the discrimination by the discrimination unit are carried out a predefined number of times,
the correctness detection unit calculates a probability of correctness of the label attached by the labeling unit based on discrimination results obtained by executing the processing the predefined number of times by the discrimination unit, and based on the probability of correctness of the label thus calculated, detecting learning data with a label attached by the labeling unit that may be incorrect.

2. The discrimination device according to claim 1, wherein the correctness detection unit provides an operator with learning data having a probability of correctness of the calculated label that is lower than a predefined threshold value.

3. The discrimination device according to claim 1, wherein difficulty in discrimination of the learning data set is determined on a basis of a statistic distribution of the probability of correctness of the label of the learning data contained in the learning data set.

4. A discrimination device comprising:
an extraction unit for extracting from a data set based on labeled data a sub-learning data set to be used for learning and a sub-verification data set to be used for verification;
a discrimination unit for conducting discrimination processing on each piece of data contained in the sub-verification data set based on the sub-learning data set; and
a detection unit for detecting whether the data has a label that may be incorrect on a basis of a result of the discrimination processing, wherein
the extraction by the extraction unit and the discrimination processing by the discrimination unit are performed a predetermined number of times.

5. The discrimination device according to claim 4, wherein the detection unit provides an operator with data having a calculated label which probability of correctness is lower than a predefined threshold value.

6. The discrimination device according to claim 4, wherein difficulty in discrimination of the data set is determined on a basis of a statistic distribution of the probability of correctness of the label contained in the data set.

7. A machine learning method comprising:
a learning data memory for storing a learning data set consisting of a plurality of learning data;
a first step of acquiring data related to an object to be discriminated;
a second step of labeling the learning data acquired in the first step;
a third step of extracting from a set of learning data thus labeled in the second step a sub-learning data set to be used for learning and a sub-verification data set to be used for verification;
a fourth step of conducting supervised learning on a basis of the sub-learning data set to generate a trained model for discriminating the label from the data related to the object;
a fifth step of carrying out discrimination using the trained model on learning data contained in the sub-verification data set;
a sixth step of recording results of the discrimination processing performed on each learning data in the fifth step in association with the learning data; and
a seventh step of detecting learning data attached with a label that may be incorrect on a basis of the results of the discrimination processing recorded in association with the respective learning data in the sixth step, wherein
the third to fifth steps are executed a predefined number of times,
the seventh step calculates a probability of correctness of the label attached to each learning data based on the results of the discrimination processing executed the predefined number of times in the fifth step to detect learning data attached with a label that may be incorrect based on the probability of correctness of the label thus calculated.

* * * * *